United States Patent
Aguirre

(12)
(10) Patent No.: US 6,501,389 B1
(45) Date of Patent: Dec. 31, 2002

(54) AUDIO, VIDEO, OR MULTIMEDIA SYSTEM KEYPAD CONTROLLER HAVING MULTIPLE VECTOR CONTROL PATHS AND ASSOCIATED METHODS

(75) Inventor: Hector M. Aguirre, Miami, FL (US)

(73) Assignee: Niles Audio Corporation, Miami, FL (US)

(*) Notice: Subject to any disclaimer, the term of this patent is extended or adjusted under 35 U.S.C. 154(b) by 0 days.

(21) Appl. No.: 09/406,035

(22) Filed: Sep. 27, 1999

(51) Int. Cl.[7] .............................................. G05B 23/00
(52) U.S. Cl. ........................... 340/825.25; 340/825.24; 340/7.48; 340/3.5; 348/14.05
(58) Field of Search ...................... 340/825.14, 825.25, 340/7.48, 3.1, 3.5, 3.71; 348/14.05; 341/22

(56) References Cited

U.S. PATENT DOCUMENTS

| | | | |
|---|---|---|---|
| 5,086,385 A | 2/1992 | Launey et al. ............... 364/188 |
| 5,414,762 A | 5/1995 | Flisik et al. ................. 379/198 |
| 5,500,794 A | * 3/1996 | Fujita et al. ................... 700/83 |
| 5,621,662 A | 4/1997 | Humphries et al. .......... 364/550 |
| 5,625,350 A | * 4/1997 | Fukatsu et al. ......... 340/825.25 |
| 5,629,687 A | 5/1997 | Sutton et al. ................ 340/825 |
| 5,761,320 A | 6/1998 | Farinelli et al. ............... 381/81 |
| 5,805,073 A | 9/1998 | Nagano et al. .............. 340/825 |
| 5,842,032 A | 11/1998 | Bertsch ....................... 395/800 |
| 5,966,528 A | * 10/1999 | Wilkinson et al. ........... 712/222 |
| 6,069,621 A | * 5/2000 | Schupak ....................... 348/10 |
| 6,282,205 B1 | * 8/2001 | Lu .............................. 370/465 |

* cited by examiner

Primary Examiner—Donnie L. Crosland
(74) Attorney, Agent, or Firm—Lott & Friedland, P.A.

(57) ABSTRACT

An audio, video, or multimedia control system and associated method are provided. The audio, video or multimedia control system preferably includes at least one keypad responsive to a user and a keypad controller responsive to the at least one keypad. The keypad controller preferably has a multiple vector command path protocol to operate the controller through a plurality of multiple vector command paths within an application or other equivalent layer of an audio, video, or multimedia communication network. The system also preferably has a plurality of communication channels connected to the at least one audio, video or multimedia keypad controller and a plurality of audio, video, or multimedia devices each connected to at least one of the plurality of communication channels and positioned within a plurality of rooms within a home or business so as to define the audio, video, or multimedia communications network.

33 Claims, 4 Drawing Sheets

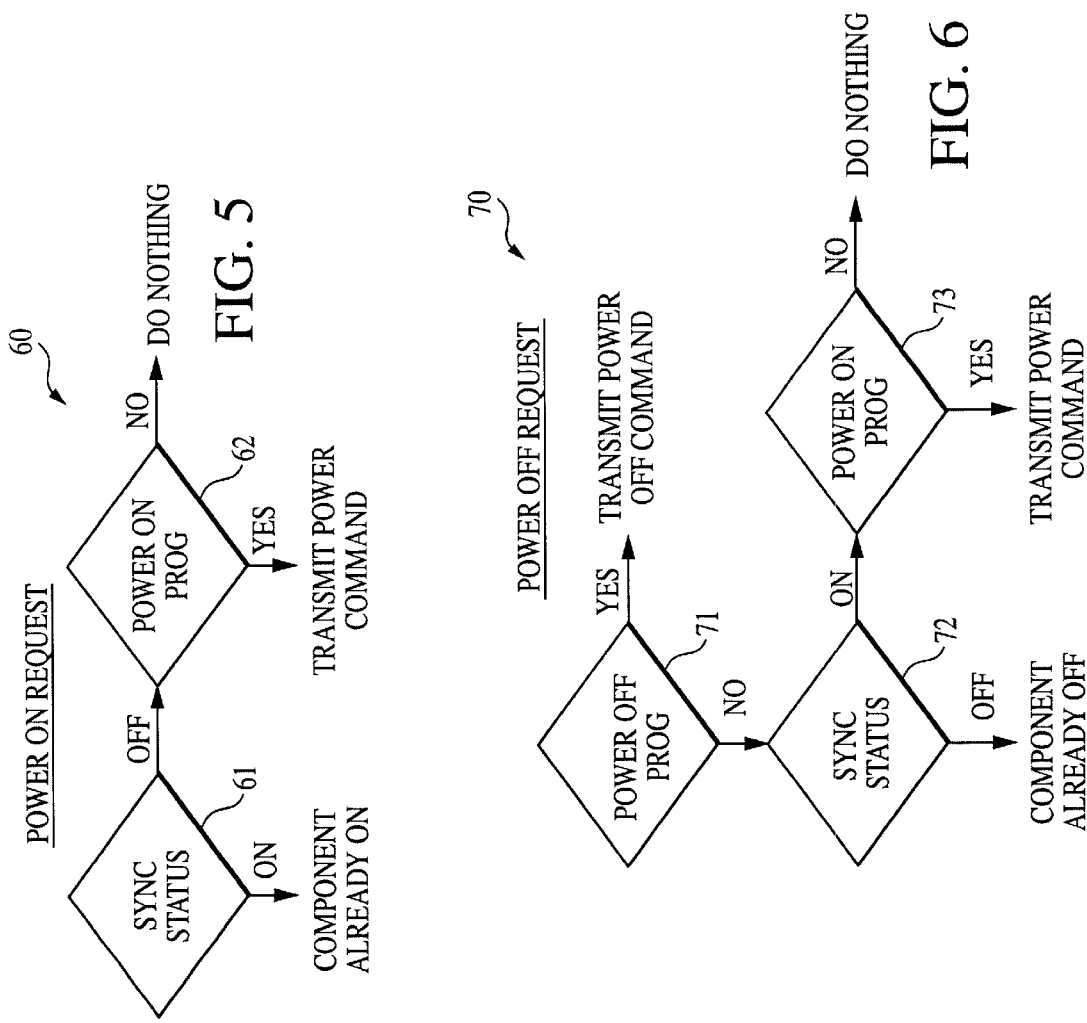
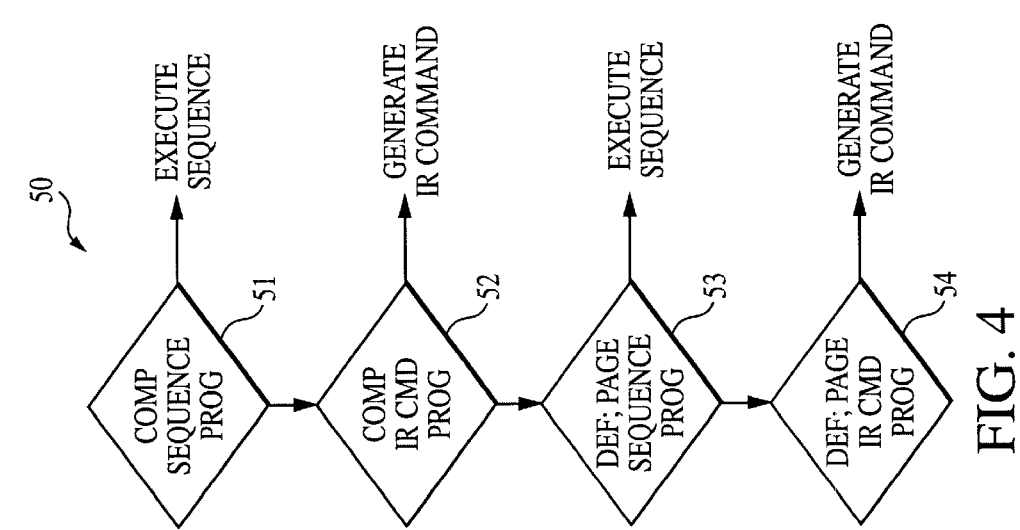

AUDIO, VIDEO, OR MULTIMEDIA SYSTEM KEYPAD CONTROLLER HAVING MULTIPLE VECTOR CONTROL PATHS AND ASSOCIATED METHODS

FIELD OF THE INVENTION

The present invention relates to the home or business office automation industries and, more particularly, to an audio, video or multimedia control system for home or business offices and related methods.

BACKGROUND OF THE INVENTION

In the past, much of home or office automation has been only on a theoretical basis. The cost, communication hardware and software requirements, and practicalities of such home automation have been unrealistic. Recently, however, various communication requirements have begun to be addressed and the cost of communicating within a network of devices has begun to decline in many homes and offices. Also, homes and offices have been initially wired in anticipation of home and office automation concepts. Some home automation systems, such as seen in U.S. Pat. No. 5,621,662 by Humphries et al. titled "Home Automation System," generate messages within a network which include an address for indicating the destination of the message and a segment indicating the type of message. Other home automation systems, such as seen in U.S. Pat. No. 5,805,073 by Nagano et al. title "Apparatus For Connecting Electric Appliances," connect electric appliances by transmitting control signals using a multiple part code having a command field and a device field. Still other systems, such as seen in U.S. Pat. No. 5,629,687 by Sutton et al. titled "Universal Interface For Remotely Monitored Security Systems," use a universal interface for remotely monitoring components within a network and use look up tables for translating commands entered by a user on a keypad. Yet other systems have been developed, such as seen in U.S. Pat. No. 5,086,385 by Launey et al. titled "Expandable Home Automation System," which requires a complex hardware network which uses two separate sets of switches to control a plurality of devices or appliances.

Little development effort continues to be exerted on an application or other equivalent layer of a home or office automation system, and especially on user interface to the home or office automation system such as through a keypad using the application or other equivalent layer. This lack of focus and understanding of the application or other equivalent layer makes it difficult to readily add-on additional or new audio, video, multimedia or other devices within a network without major software reprogramming tasks being required or major hardware rewiring or reconfiguration of a network being required as needed for these other systems.

SUMMARY OF THE INVENTION

With the foregoing in mind, the present invention advantageously provides an audio, video, or multimedia keypad controller and associated methods which is flexible so that additional audio, video or multimedia devices can readily be added to an audio, video or multimedia device communications network and so that the audio, video or multimedia keypad controller can readily handle both single and multiple zoned audio, video or multimedia device communication networks. The present invention also advantageously provides an audio, video or multimedia keypad controller which can readily handle tiered audio, video or multimedia device add-ons to an audio, video or multimedia device communications network system without major software reprogramming or major hardware rewiring or reconfiguration. The present invention further advantageously provides an audio, video or multimedia keypad controller and method of communicating within a network which uses a multi-dimensional vector table or analysis to more accurately and quickly locate and issue a command to an audio, video or multimedia related or other device within the network.

More particularly, the present invention provides an audio, video or multimedia control system which preferably has at least one keypad responsive to a user and an audio, video or multimedia keypad controller responsive to the at least one keypad. The audio, video or multimedia keypad controller preferably has multiple vector command path operating means for operating the controller with a multiple vector command path protocol in an application or other equivalent layer of an audio, video or multimedia device communications network. The audio, video or multimedia control system preferably also has a plurality of audio, video or multimedia communication channels connected to the at least one audio, video or multimedia keypad controller and a plurality of audio, video or multimedia devices each connected to at least one of the plurality of audio, video or multimedia communication channels and positioned within a plurality of rooms within a home or business so as to define the audio, video or multimedia device communications network.

The present invention also advantageously includes a method of communicating commands to a plurality of audio, video or multimedia devices positioned in a network having a keypad and a keypad controller positioned in communication with the keypad. The method preferably includes generating a communication code from the keypad responsive to a user interfacing with the keypad and operating the keypad controller in an application or other equivalent layer of the network with a multiple vector command path protocol responsive to the communication code from the keypad.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 4 is a schematic flow diagram of a multiple vector command path protocol of an audio, video or multimedia keypad controller according to the present invention;

FIG. 5 is a schematic flow diagram of power management of a multiple vector command path protocol of an audio, video or multimedia keypad controller according to the present invention; and FIG. 6 is a schematic flow diagram of power management of a multiple vector command path protocol of an audio, video or multimedia keypad controller according to the present invention.

DETAILED DESCRIPTION OF PREFERRED EMBODIMENTS

The present invention will now be described more fully hereinafter with reference to the accompanying drawings which illustrate preferred embodiments of the invention. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and/or double prime notation, if used, indicate similar elements in alternative embodiments.

Figure 1:
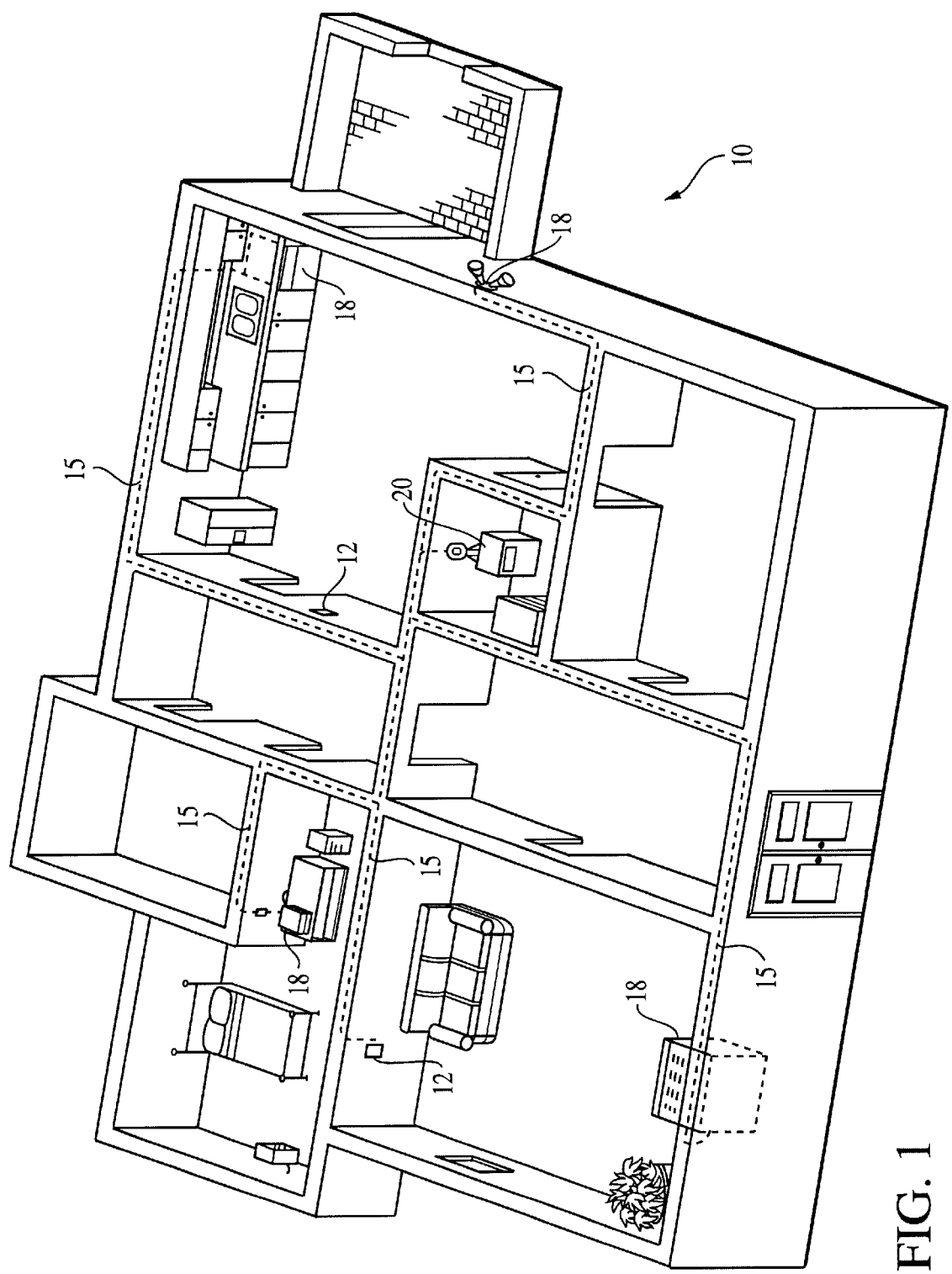
FIG. 1 is a schematic diagram of a home or office audio, video or multimedia automation system having an audio, video or multimedia control system according to the present invention.
Figure 2:
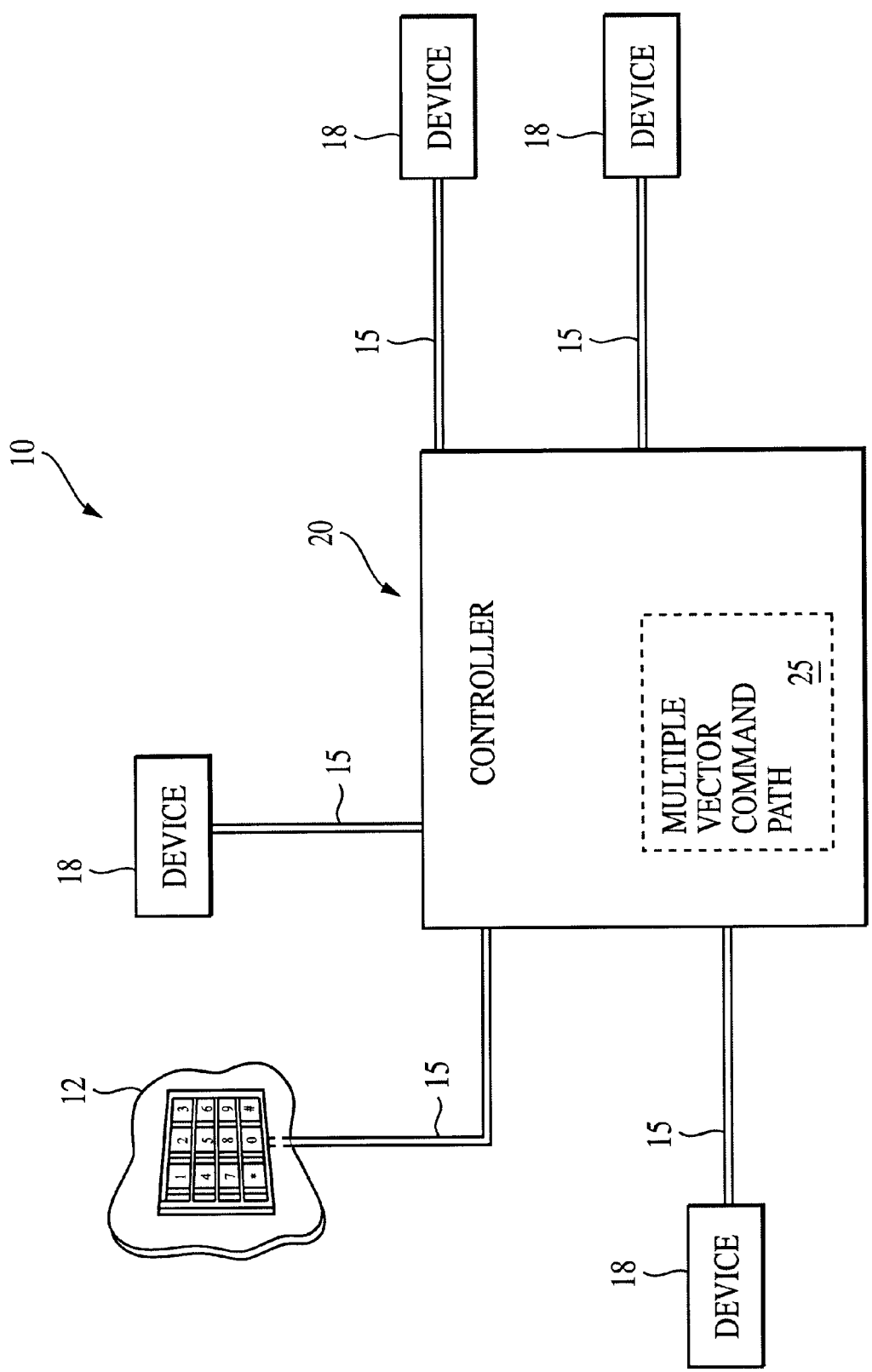
FIG. 2 is a schematic diagram of an audio, video or multimedia control system having an audio, video or multimedia keypad and an audio, video or multimedia keypad controller according to the present invention.

FIGS. 1–2 illustrate a home or office automation audio, video or multimedia control system 10 having an audio, video or multimedia device communications network which recognizes importance of and focuses on the application or other equivalent layer of the network. The audio, video or multimedia control system 10 preferably has at least one keypad 12 which includes a plurality of keys mounted to a housing and which is responsive to a user. The system 10 also has an audio, video, or multimedia keypad controller 20 responsive to the at least one keypad 12. The keypad controller 20 can be hardwired or directly connected to the keypad 12, can be connected through a through-the-air link as understood by those skilled in the art to the keypad 12, can be positioned to communicate using fiber optics or other cabling to the keypad 12, or have some other communicating configuration. The audio, video or multimedia keypad controller 20 preferably has multiple vector command path operating means 25, e.g., preferably provided by software programs or routines within a micro-controller or other hardware or firmware as understood by those skilled in the art, for operating the controller 20 with a multiple vector command path ("MVCP") protocol in an application or other equivalent layer of an audio, video or multimedia device communications network. The audio, video or multimedia control system 10 preferably also has a plurality of audio, video or multimedia communication channels 15 connected to the at least one audio, video or multimedia keypad controller 20 and a plurality of audio, video or multimedia devices or components 18, e.g., a compact disc player, an audio amplifier, a speaker, a television, a personal computer, which can be quite different from each other or substantially the same, each connected to at least one of the plurality of audio, video or multimedia communication channels 15 and positioned within a plurality of rooms within a home or business so as to define the audio, video or multimedia device communications network.

As understood by those skilled in the art, the plurality of audio, video or multimedia communication channels 15 each are preferably defined by a conductor cable having a plurality of conductors. The plurality of conductors preferably are formed by an eight conductor cable having connections at least for voltage, ground, bidirectional data, source selection indication, mute and power status, and paging. The cable is preferably conventional telephone wiring for system architecture as understood by those skilled in the art. The wiring is conventionally an eight conductor cable or the instructions can be transmitted by optical fiber or wireless methods such as infrared, radio frequency or other similar technology.

Figure 3:
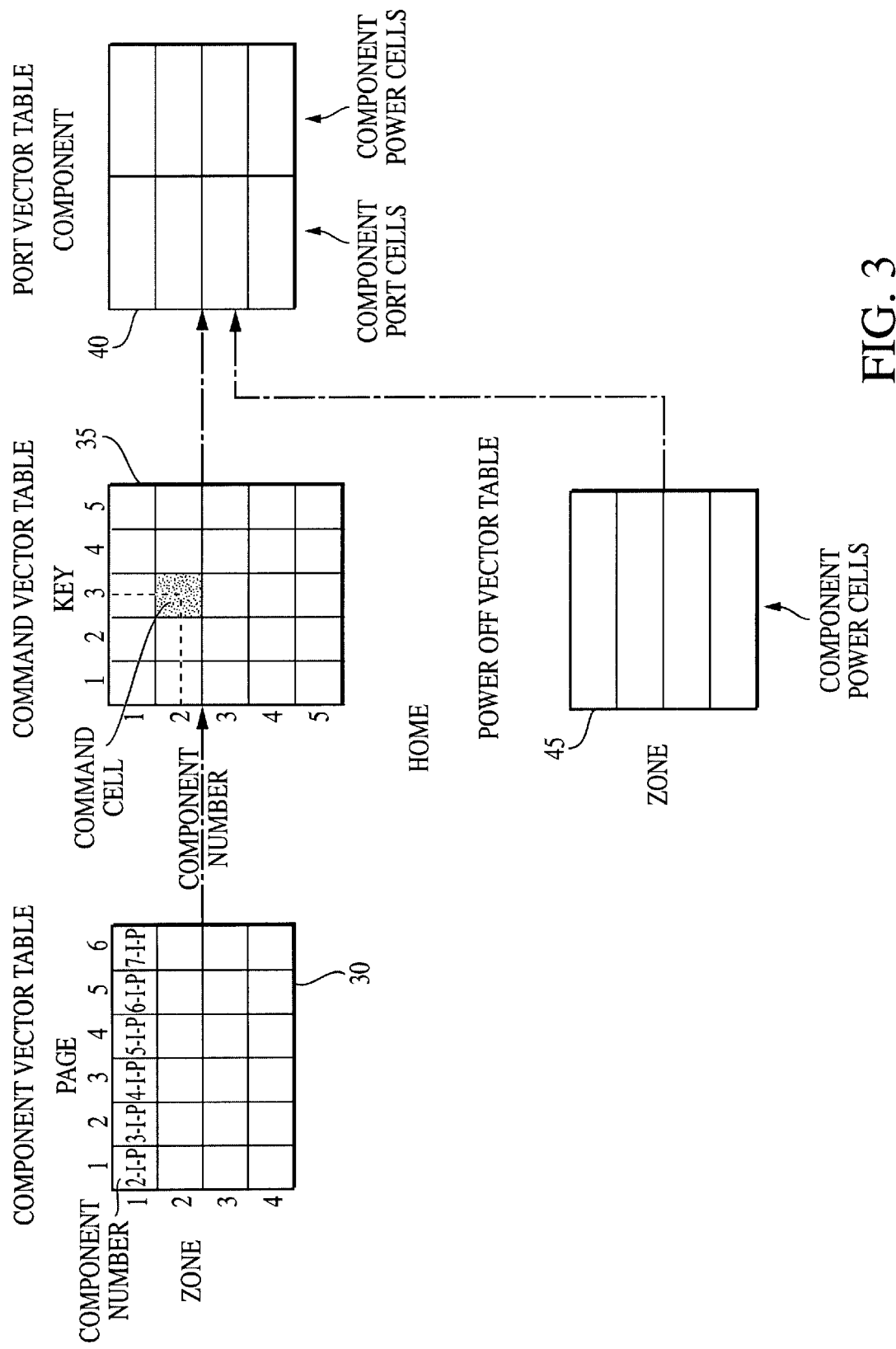
FIG. 3 is a schematic flow diagram of an audio, video or multimedia keypad controller having a multiple vector command path protocol according to the present invention.

As perhaps best shown in FIGS. 2–4, the MVCP protocol is preferably a command processing technique or software routine for an audio, video, or multimedia keypad control system 20. The keypad 12 of the audio, video or multimedia control system 20 preferably generates a communication code responsive to the user. The multiple vector command path operating means 25 is responsive to the communication code from the keypad 12. The multiple vector command path operating means 25 includes a server module, as understood by those skilled in the art, responsive to the communication code which separates the communication code into a plurality of command code portions, and more preferably four command code portions. The plurality of command code portions define a protocol for locating and issuing commands to the plurality of audio, video or multimedia devices 18 within the network. The four command code portions preferably include a customer code, a zone identifier, a page number, and a key number.

The multiple vector command path operating means 25 preferably further includes a multidimensional array of a plurality of component cells defining a component vector table 30 and having a zone identifier as an x-axis and a page number as a y-axis so that a selected component cell of the component vector table 30 includes a component number which identifies one of the plurality of audio, video, or multimedia devices or components 18 to be controlled. Also, the multiple vector command path operating means 25 preferably includes a multidimensional array of a plurality of command cells defining a command vector table 35 and having the component number as an x-axis and the key number as the y-axis so that a selected command cell responsively executes a command when a key of the keypad is engaged by a user. A selected command cell has a first command format defining an audio, video or multimedia device function to be performed by an audio, video or multimedia device 18 within the network and a second command format defining a power configuration for an audio, video or multimedia device 18 within the network.

The audio, video or multimedia device function of the first command format includes a command pointer and a sequence string pointer, and the second command format includes a plurality of sequence string pointers.

The multiple vector command path operating means 25 further includes a multidimensional array of a plurality of port cells defining a port vector table 40 and having an audio, video or multimedia device port as an x-axis and a route as a y-axis. Each of the plurality of port cells has a first port format for route specific audio, video or multimedia device ports and a second port format for supporting power management of an audio, video or multimedia device (see also FIGS. 5–6).

A more detailed operation of an audio, video, or multimedia control system 20 using the MVCP protocol is now described further herein. To issue an IR or other data command or sequence, a key, on what can be described as a "dumb" keypad 12 is pressed or engaged by user interfacing with the keypad 12. A communication code is sent to the server module. Once received, the server module separates the communications code into the four parts, e.g., customer code, zone ID, page number, and key number. The customer code, or first of the four portions or parts, is a code identifiable to a specific manufacturer. This allows a system installer to readily recognize audio, video sensors, or other devices within a network. The remaining three parts or portions of the communications code provide the server module with enough information to locate and issue correct commands to the devices of the network. The process by which these four codes pinpoint the desired IR or other data command or sequence responsive to a user's interface with a keypad 12 is known as the MVCP protocol.

For a function key request, before a server module can generate a function control IR or other data command or sequence, the command must be located by the MVCP protocol. The MVCP protocol preferably uses a series of vector tables 30, 35, 40 as described above herein (see FIG. 3). The first of these tables is the component vector table 30 which determines a component number. The component or sensor number identifies the source component desired to be controlled. A second vector table, the command vector table 35, then uses the component number to locate any sequence or IR or other data command stored in a command cell. A sequence is preferably checked first and then a dedicated IR or other data command.

Whenever the case arises that no commands are stored in a command cell, however, the MVCP protocol will want to determine if any commands are stored on a default page, e.g., a page of commands common to all components. To do so, the MVCP protocol again uses the component vector table 30, this time to determine a default page number. Having determined a default page number, the MVCP protocol uses the second table, the command vector table 35, to locate the default page where any default sequences or IR or other data commands will be stored. Again, the MVCP protocol will check first for sequences and then for a dedicated IR or other data command.

Once a sequence or dedicated IR or other data command is located, it is routed to the port vector table 40. The port vector table 40 is used to determine if a port of a device or component 18 is enabled or not to determine whether to generate an IR or other data command for that audio, video, or multimedia device number. If the bit for the component 18, e.g., audio, video, or multimedia device, number is set, it will issue the command. If not, no command will be issued from that port.

The component number identifies the desired device or component 18, for example a compact disc player. That number is determined using the second and third parts of the code generated by the dumb keypad 12, i.e., the zone identifier and the page number. A simple vector table, i.e., the component vector table 30, where the zone ID is the x-axis and the page number is the y-axis determines the component number. In an example (see FIG. 3), the dumb keypad 12 generates a code containing a zone ID of 1 and a page number of 1 which results in a component number of 2. The selected cell is also programmed with the default page number. The default page number in the example is also 1.

A component number of 2 identifies the CD player as the desired component. The MVCP protocol now uses that information, the component number, to locate the desired IR command (for example the play command for the CD player) on the second vector table, i.e., the command vector table 35. By referring to the table of FIG. 3 and the flow diagram 50 of FIG. 4, it can be seen that the command cell is determined using the component number and the key number, the fourth part of the original code generated by the dumb keypad 12. Placing the component number on the x-axis and the key number on the y-axis, the MVCP protocol locates the command cell which is represented by the shaded portion of the table.

When the CD play key is selected, the MVCP protocol first checks the command cell for a sequence (see 51–54 of FIG. 4). Finding none, it will continue to check for an IR command. In this instance, it finds the desired IR command and generates that command. In another instance, the volume up key is pressed. As always, the MVCP protocol first checks for a sequence and then an IR command in a function command cell. Typically, however, volume up and volume down commands are assigned to the default component which is pointed by the default page in the selected cell in the component vector table 30.

So, when finding neither a sequence nor an IR command assigned to a function command cell, the MCVP will then check the component vector table 30 for default page number. Again, a sequence is checked first and then a dedicated default volume up command (see FIG. 3).

The IR request generated in the above description is then routed to the port vector table 40. The port vector table 40 generates and routes the actual IR code for the component 18. Each port preferably contains a bit for each component 18 that the audio, video, or multimedia control system 20 supports. So, if the system 20 supports a total of 16 components or devices 18, 16 bits (or two bytes) are required. If the bit for the component number is set, the ports IR output is enabled. If the bit is not set, however, the port's IR output is disabled. Port configurations are independent from each other and more than one port IR output can be enabled at the same time thereby allowing for multiple zones within a system 20.

In addition to function control IR commands and sequences, the MVCP can also advantageously process power requests. To do so, it must first locate the power command, again using the component vector table 30. When the power command is located, an initial sequence, if any, is executed. Next, the MVCP protocol can determine whether or not to generate the power command, depending on the synchronization status of the source component 18. Finally, an ending sequence, if any, is executed. A power off request 70 (see FIG. 6) simply issues a power off command based on synchronization status (or power IR command in the case of a toggling power command) and whether or not a command is programmed.

The configuration for a power on request 60 is contained in the same cell as the component number and default page (see FIG. 5). Determining which cell to execute is done the same as a function key request by using the second and third parts of the code generated by the dumb keypad 12, the zone ID and the page number. Again, using a simple vector table, the component vector table, where the zone ID is the x-axis and the page number is the y-axis, the cell containing the power on configuration is determined.

The selected command cell's power on configuration preferably has two sequences, namely an initial sequence and an ending sequence. When a component power on command is received, an initial sequence (if programmed) for that component is executed. After the initial sequence is complete, a power on request is issued for each component whose bit is set in the command cell. This power on request is actually processed by the port vector table 40. Once all the power on requests are processed, the ending sequence (if programmed) is executed.

The port vector table 40 actually manages the component's power. When the port vector table 40 receives a power on request 60, the component's synchronization status is checked. If the synchronization status is off, the power on command (if programmed) is transmitted to the component 18, which should turn on the component 18 (see 61–62 of FIG. 5).

When a power off request 70 is received (see also the power vector table 45), the MVCP protocol processes that command based on the synchronization status of the source component 18. If the power off command is programmed, it is transmitted to the component 18, which should turn off the component 18. If the power off command is not programmed and the power on command is programmed, it is assumed the component 18 has a toggling power command (see 71–73 of FIG. 6). The synchronization status is checked and if it is off, the power command is transmitted, which should turn off the component 18, e.g., the CD player.

As illustrated in FIGS. 1–6, the present invention also includes a method of communicating commands to a plurality of audio, video or multimedia devices 18 positioned in a network having a keypad 12 and a keypad controller 20 positioned in communication with the keypad 12. The method preferably includes generating a communication code from the keypad 12 responsive to a user interfacing with the keypad 12 and operating the keypad controller 20 in an application or other equivalent layer of the network with a multiple vector command path protocol responsive to a the communication code from the keypad 12. The method can also include the step of operating the keypad controller 20 including separating the communication code into a plurality of command portions, e.g., four, defining a protocol for locating and issuing commands to the plurality of audio, video, or multimedia devices within the network 18. The four command portions preferably include a customer code, a zone identifier, a page number, and a key number.

The method can also include the step of selecting a component cell in a multidimensional array of a plurality of component cells defining a component vector table 30 and having a zone identifier as an x-axis and a page number as a y-axis. The selected component cell of the component vector table 30 has a component number which identifies one of the plurality of audio, video or multimedia devices 18 to be controlled. The operating of the keypad controller 20 further includes selecting a command cell from a multidimensional array of a plurality of command cells defining a command vector table 35 and having the component number as an x-axis and the key number as the y-axis so that the selected command cell responsively executes a command when a user interfaces with a key of the keypad 12. A selected command cell has a first command format defining an audio, video or multimedia device function, e.g., play, stop, fast-forward, rewind, etc., to be performed by an audio, video or multimedia device 18 within the network and a second command format defining a power configuration for an audio, video or multimedia device or component 18 within the network. The audio, video or multimedia device function of the first command format includes a command pointer and a sequence string pointer, and wherein the second command format includes a plurality of sequence string pointers.

The method can further include the operating step of selecting a port cell from a multi-dimensional array of a plurality of port cells defining a port vector table 40 and having an audio, video or multimedia device port as an x-axis and a network route as a y-axis. Each of the plurality of port cells has a first port format for route specific audio, video or multimedia device ports and a second port format for supporting power management of an audio, video or multimedia device.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

What is claimed is:

1. An audio, video or multimedia control system, the system comprising:
   at least one keypad responsive to a user;
   an audio, video or multimedia keypad controller responsive to the at least one keypad, the audio, video or multimedia keypad controller having multiple vector command path operating means for operating the controller with a multiple vector command path protocol in an application or other equivalent layer of an audio, video or multimedia communications network;
   a plurality of audio, video or multimedia communication channels connected to the at least one audio, video or multimedia keypad controller; and
   a plurality of audio, video or multimedia devices each connected to at least one of the plurality of audio, video or multimedia communication channels and positioned within a plurality of rooms within a home or business so as to define the audio, video or multimedia communications network.

2. A system as defined in claim 1, wherein said keypad generates a communication code responsive to the user, and wherein said multiple vector command path operating means is responsive to the communication code from said keypad.

3. A system as defined in claim 2, wherein said multiple vector command path operating means includes a synchronous audio, video or multimedia power module responsive to the communication code which separates the communication code into a plurality of command code portions, the plurality of command code portions defining a protocol for locating and issuing commands to the plurality of audio, video or multimedia devices within the network.

4. A system as defined in claim 3, wherein the plurality of command code portions include at least two of the following: customer code, zone identifier, page number, and key number.

5. A system as defined in claim 4, wherein said multiple vector command path operating means further includes a multi-dimensional array of a plurality of component cells defining a component vector table and having a zone identifier as an x-axis and a page number as a y-axis so that a selected component cell of the component vector table includes a component number which identifies one of the plurality of audio, video or multimedia devices to be controlled.

6. A system as defined in claim 5, wherein said multiple vector command path operating means further includes a multi-dimensional array of a plurality of command cells defining a command vector table and having the component number as an x-axis and the key number as the y-axis so that a selected command cell responsively executes a command when a key of the keypad is engaged by a user.

7. A system as defined in claim 6, wherein a selected command cell has a first command format defining an audio, video or multimedia device function to be performed by an audio, video or multimedia device within the network and a second command format defining a power configuration for an audio, video or multimedia device within the network.

8. A system as defined in claim 7, wherein the audio, video or multimedia device function of the first command format includes a command pointer and a sequence string pointer, and wherein the second command format includes a plurality of sequence string pointers.

9. A system as defined in claim 6, wherein said multiple vector command path operating means further includes a multi-dimensional array of a plurality of port cells defining a port vector table and having an audio, video or multimedia device port as an x-axis and a route as a y-axis.

10. A system as defined in claim 9, wherein each of the plurality of port cells has a first port format for route specific audio, video or multimedia device ports and a second port format for supporting power management of an audio, video or multimedia device.

11. A system as defined in claim 1, wherein the plurality of audio, video or multimedia communication channels each comprise a conductor cable having a plurality of conductors.

12. A system as defined in claim 11, wherein the plurality of conductors comprise an eight conductor cable having connections at least for voltage, ground, bidirectional data, source selection indication, mute and power status, and paging.

13. An audio, video, or multimedia control system, the system comprising:
at least one keypad responsive to a user;
a keypad controller responsive to the at least one keypad, the keypad controller having multiple vector command path protocol to operate the controller through a plurality of multiple vector command paths within an application or other equivalent layer of an audio, video, or multimedia communications network;
a plurality of communication channels connected to the at least one keypad controller; and
a plurality of audio, video, or multimedia devices each connected to at least one of the plurality of communication channels and positioned within a plurality of rooms within a home or business so as to define the audio, video, or multimedia device communications network.

14. A system as defined in claim 13, wherein said keypad generates a communication code responsive to the user, and wherein said multiple vector command path protocol is responsive to the communication code from said keypad.

15. A system as defined in claim 14, wherein said keypad controller further includes a synchronous audio power module responsive to the communication code which separates the communication code into a plurality of command code portions, the plurality of command code portions defining the multiple vector command path protocol which locates and issues commands to the plurality of audio, video or multimedia devices within the network.

16. A system as defined in claim 15, wherein the plurality of command code portions include at least two of the following: customer code, zone identifier, page number, and key number.

17. A system as defined in claim 16, wherein said keypad controller further includes a multidimensional array of a plurality of component cells defining a component vector table and having a zone identifier as an x-axis and a page number as a y-axis so that a selected component cell of the component vector table includes a component number which identifies one of the plurality of audio, video or multimedia devices to be controlled.

18. A system as defined in claim 17, wherein said keypad controller further includes a multidimensional array of a plurality of command cells defining a command vector table and having the component number as an x-axis and the key number as the y-axis so that a selected command cell responsively executes a command when a key of the keypad is engaged by a user.

19. A system as defined in claim 18, wherein a selected command cell has a first command format defining an audio, video or multimedia device function to be performed by an audio, video or multimedia device within the network and a second command format defining a power configuration for an audio, video or multimedia device within the network.

20. A system as defined in claim 19, wherein the audio, video or multimedia device function of the first command format includes a command pointer and a sequence string pointer, and wherein the second command format includes a plurality of sequence string pointers.

21. A system as defined in claim 18, wherein said keypad controller further includes a multidimensional array of a plurality of port cells defining a port vector table and having an audio, video or multimedia device port as an x-axis and a route as a y-axis.

22. A system as defined in claim 21, wherein each of the plurality of port cells has a first port format for route specific audio, video or multimedia device ports and a second port format for supporting power management of an audio, video or multimedia device.

23. A system as defined in claim 13, wherein the plurality of audio, video or multimedia communication channels each comprise a conductor cable having a plurality of conductors.

24. A system as defined in claim 23, wherein the plurality of conductors comprise an eight conductor cable having connections at least for voltage, ground, bidirectional data, source selection indication, mute and power status, and paging.

25. A method of communicating commands to a plurality of audio, video or multimedia devices positioned in a network having a keypad and a keypad controller positioned in communication with the keypad, the method comprising the steps of:
generating a communication code from the keypad responsive to a user interfacing with the keypad; and
operating the keypad controller in an application or other equivalent layer of the network with a multiple vector command path protocol responsive to a the communication code from the keypad.

26. A method as defined in claim 25, wherein the step of operating the keypad controller includes separating the communication code into a plurality of command portions defining a protocol for locating and issuing commands to the plurality of audio, video or multimedia devices within the network.

27. A method as defined in claim 26, wherein the plurality of command code portions include at least two of the following: customer code, zone identifier, page number, and key number.

28. A method as defined in claim 27, wherein the operating of the keypad controller further includes selecting a component cell in a multi-dimensional array of a plurality of component cells defining a component vector table and having a zone identifier as an x-axis and a page number as a y-axis, the selected component cell of the component vector table having a component number which identifies one of the plurality of audio, video or multimedia devices to be controlled.

29. A method as defined in claim 28, wherein the operating of the keypad controller further includes selecting a command cell from a multi-dimensional array of a plurality of command cells defining a command vector table and having the component number as an x-axis and the key number as the y-axis so that the selected command cell responsively executes a command when a user interfaces with a key of the keypad.

30. A method as defined in claim 29, wherein a selected command cell has a first command format defining an audio, video or multimedia device function to be performed by an audio, video or multimedia device within the network and a second command format defining a power configuration for an audio, video or multimedia device within the network.

31. A method as defined in claim 30, wherein the audio, video or multimedia device function of the first command format includes a command pointer and a sequence string pointer, and wherein the second command format includes a plurality of sequence string pointers.

32. A method as defined in claim 31, wherein the operating step further includes selecting a port cell from a multi-dimensional array of a plurality of port cells defining a port vector table and having an audio, video or multimedia device port as an x-axis and a network route as a y-axis.

33. A method as defined in claim 32, wherein each of the plurality of port cells has a first port format for route specific audio, video or multimedia device ports and a second port format for supporting power management of an audio, video or multimedia device.

* * * * *